(12) United States Patent
Taniuchi

(10) Patent No.: US 8,319,375 B2
(45) Date of Patent: Nov. 27, 2012

(54) POWER SUPPLY SYSTEM AND ELECTRONIC INSTRUMENT

(75) Inventor: Hirotada Taniuchi, Kanagawa (JP)

(73) Assignee: Sony Mobile Communications Japan, Inc., Tokyo (JP)

( * ) Notice: Subject to any disclaimer, the term of this patent is extended or adjusted under 35 U.S.C. 154(b) by 441 days.

(21) Appl. No.: 12/628,417

(22) Filed: Dec. 1, 2009

(65) Prior Publication Data

US 2010/0148580 A1  Jun. 17, 2010

(30) Foreign Application Priority Data

Dec. 17, 2008 (JP) ................................ 2008-320794
Mar. 23, 2009 (JP) ................................ 2009-070314

(51) Int. Cl.
*H02J 3/00* (2006.01)
(52) U.S. Cl. ............... 307/86; 307/29; 307/30; 307/38; 320/103; 320/132
(58) Field of Classification Search .................. 307/18, 307/29–30, 82, 131, 38, 86–87; 320/103, 320/132
See application file for complete search history.

(56) References Cited

U.S. PATENT DOCUMENTS

| | | | | |
|---|---|---|---|---|
| 5,986,353 A * | 11/1999 | Kohler | ............................. | 307/38 |
| 6,429,623 B2 | 8/2002 | Hanada | | |
| 6,445,162 B1 * | 9/2002 | Mukainakano | ................ | 320/132 |
| 6,628,010 B2 * | 9/2003 | Yamamura et al. | ............. | 307/18 |
| 7,193,390 B2 * | 3/2007 | Nagai et al. | .................... | 320/116 |
| 7,298,116 B2 * | 11/2007 | Sluijs | ............................. | 323/222 |
| 7,498,694 B2 * | 3/2009 | Luo et al. | ......................... | 307/82 |
| 2003/0013484 A1 * | 1/2003 | Nishimura et al. | ........... | 455/556 |
| 2005/0046280 A1 * | 3/2005 | Itabashi et al. | ................ | 307/131 |
| 2005/0253560 A1 * | 11/2005 | Popescu-Stanesti et al. | . | 320/138 |
| 2006/0044724 A1 * | 3/2006 | Ishii et al. | ........................ | 361/90 |
| 2007/0096564 A1 * | 5/2007 | Maeda | ............................ | 307/87 |

FOREIGN PATENT DOCUMENTS

JP  2004-297753  10/2004
JP  2008-529177  7/2008

OTHER PUBLICATIONS

Chinese Office Action issued Feb. 16, 2012, in Patent Application No. 200910253791.8 (English-language translation only).

* cited by examiner

*Primary Examiner* — Jared Fureman
*Assistant Examiner* — Alfonso Perez Borroto
(74) *Attorney, Agent, or Firm* — Oblon, Spivak, McClellad, Maier & Neustadt, L.L.P.

(57) ABSTRACT

A power supply system is disclosed, including a first plurality of power supply units configured to supply working voltages from a battery to a second plurality of loads, a large-capacitance capacitor configured to charge electric charges from the battery, a third plurality of switching means for connecting the large-capacitance capacitor to the second plurality of loads selectively, control means for switching the third plurality of switching means corresponding to the load presently driven, and discharge means, in a case where the output voltage of the large-capacitance capacitor is higher than the operating voltage of the second load when the capacitor is switched from a first load to a second load, for discharging the charges stored in the capacitor according to the monitoring result by a voltage monitoring means so that the voltage of the capacitor decreases to the operating voltage.

16 Claims, 8 Drawing Sheets

| POWER SUPPLY UNIT | TARGET VOLTAGE |
|---|---|
| A | 2.7 V |
| B | 3.3 V |
| C | 1.8 V |
| ⋮ | ⋮ |

POWER SUPPLY SYSTEM AND ELECTRONIC INSTRUMENT

BACKGROUND OF THE INVENTION

1. Field of the Invention

The invention relates to power supply systems and electronic instruments. More particularly, the invention relates to a power supply system for supplying power to plural loads and an electronic instrument including the power supply system.

2. Description of the Related Art

In order to extend the operating time of batteries and to reduce the size and weight of mobile communication terminals operational in the system such as the time division multiple access (TDMA), time division duplication (TDD), and so forth, there has been proposed the technology of reducing the burden on the battery and resulting in longer battery life by supplying power from an electric double-layer capacitor to a power amplifier (see, Japanese Unexamined Patent Application Publication No. 2004-297753).

In addition, in the case where power is supplied to a camera flash from an electric double-layer capacitor, there has been proposed the technology of suppressing the peak current of the battery to a predetermined value or less (see, PCT Japanese Translation Patent Publication No. 2008-529177).

SUMMARY OF THE INVENTION

As described above in the related art, it is effective to provide power assists for a device (load) or application, which uses either pulse currents or large currents having a constant frequency, in view of the reduction of battery load and concomitant high efficiency.

However, since the capacitor with the capacitance as large as the order of several hundred millifarads (mF), which is necessary for the power assists, tends to have the size as large as 18 mm×15 mm even after seeking the smallest at present, it is difficult to achieve the miniaturization of an instrument as a whole, while mounting such capacitor onto each of the power supply units of plural components included in the instrument.

In view of background mentioned above, there are devised according to an embodiment of the present invention, an electric power supply unit capable of providing power assists for a plurality of loads from a battery by sharing one single large-capacitance capacitor, and electronic instruments including the power supply system.

A power supply system according to an embodiment of the invention is provided, including a first plurality of power supply units configured to supply working voltages from a battery to a second plurality of loads, a large-capacitance capacitor configured to charge electric charges from the battery, a third plurality of switching means for connecting the large-capacitance capacitor to the second plurality of loads selectively, and control means for switching the third plurality of switching means corresponding to at least one load presently in use among the second plurality of loads.

With this configuration, even in electric instruments including plural loads each using relatively large maximum instantaneous currents, the burden on the battery and electric power system can be reduced by connecting the large-capacitance capacitor selectively to the load presently driven by way of a plurality of switch means.

In addition, it is preferred that the power supply system further includes voltage monitoring means for monitoring the voltage of the large-capacitance capacitor, and discharge means, in the case where the output voltage of the large-capacitance capacitor monitored by the voltage monitoring means is found higher than an operating voltage of the second load when the capacitor is switched from a first load to a second load, for discharging charges stored in the capacitor according to the control by the control means so that the voltage of the capacitor decreases to the operating voltage.

An electronic instrument according to an embodiment of the invention is provided, including the second plurality of loads configured to be supplied with power from the battery, the first plurality of power supply units configured to supply working voltages from the battery to the second plurality of loads, the large-capacitance capacitor configured to charge electric charges from the battery, the third plurality of switching means for connecting the large-capacitance capacitor to the second plurality of loads selectively, and control means for switching the third plurality of switching means corresponding to at least one load presently in use among the second plurality of loads.

According to an embodiment of the present invention, by alleviating the burden on the battery and electric power system, longer operating life of the battery can be realized. In addition, since one single large-capacitance capacitor is shared by the plurality of loads, the size of the power supply system as well as electronic instrument can be miniaturized.

BRIEF DESCRIPTION OF THE DRAWINGS

FIG. 3 is a chart illustrating the formation of a look-up table utilized for the operation of FIG. 2;

DESCRIPTION OF THE PREFERRED EMBODIMENTS

Figure 1:
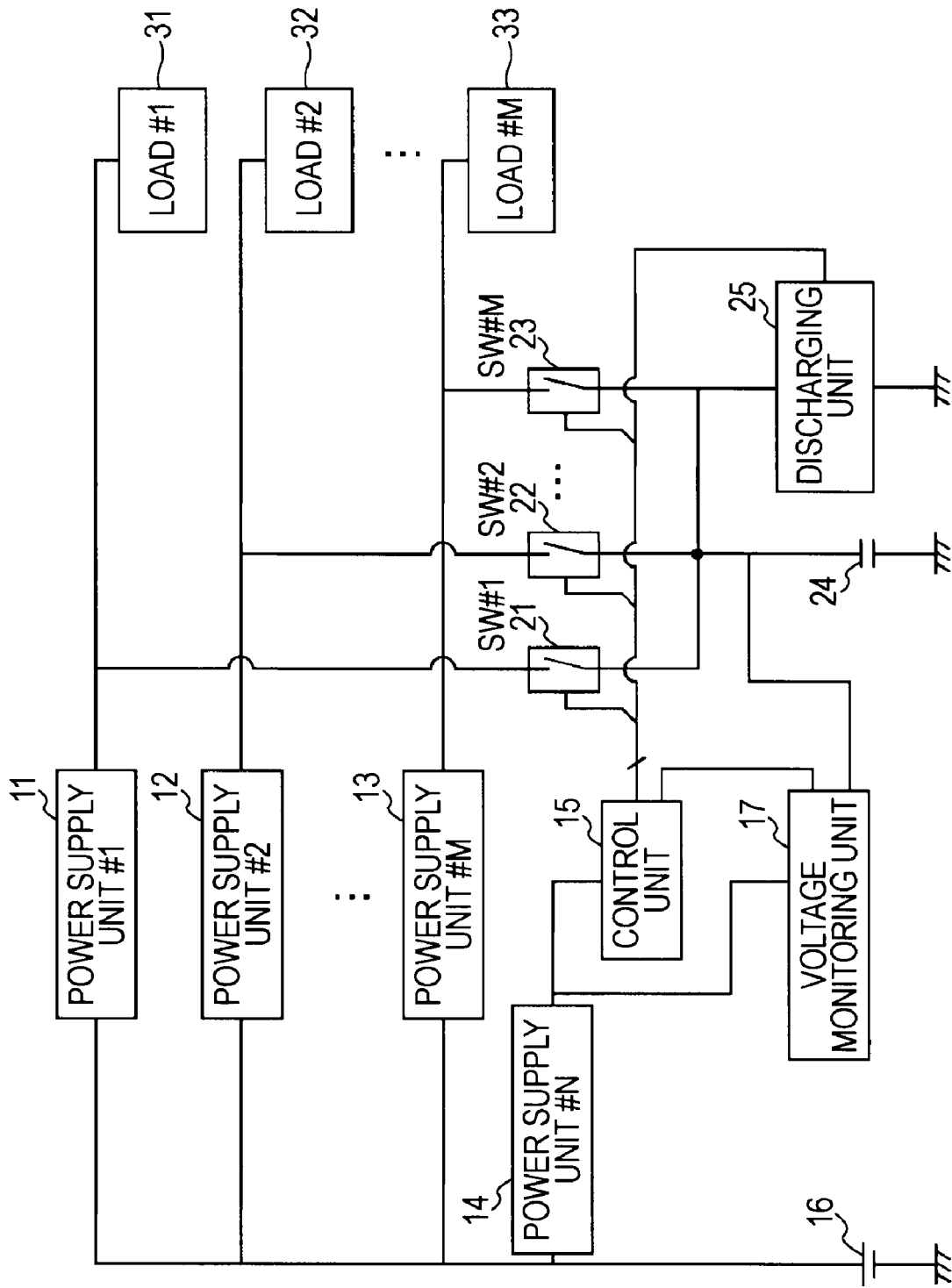
FIG. 1 is a schematic block diagram generally illustrating the configuration of a power supply system for supplying electric powers to a plurality of loads (#1 to #M) according to an embodiment of the invention.

Referring now to the drawings, preferable embodiments of the present invention will be detailed hereinbelow.

FIG. 1 is a schematic block diagram generally illustrating the configuration of a power supply system, which is configured to supply electric powers to a plurality of loads (#1 to #M) 31 to 33, according to an embodiment of the invention.

The power supply system is provided including a first plurality of power supply units (#1 to #N) 11 to 14, a voltage monitoring unit 17, a second plurality of switches (SW #1 to SW #M) 21 to 23 as switching means, a large-capacitance capacitor 24, and a discharge unit 25. Among these units and elements, the voltage monitoring unit 17, the plural switches (SW #1 to SW #M) 21 to 23 as switching means, the large-capacitance capacitor 24, and the discharge unit 25 altogether serves as an auxiliary power supply for the power supply system.

On receiving an output voltage supplied by a battery 16, plural power supply units, 11 to 13, are configured to generate the voltages for driving a third plurality of loads (#1 to #M) 31 to 33 and subsequently apply to the respective loads. The power supply unit 14 serves as the unit for supplying the power to a control unit 15 and to the voltage monitoring unit 17. Namely, the control unit 15 and voltage monitoring unit 17 are configured to have the power supplied from the power source system to which neither the switches 21 to 23 nor the large-capacitance capacitor 24 is connected.

The example of the battery 16 includes rechargeable batteries such as lithium ion (Li-ion) battery, Li polymer battery, nickel hydrogen (NiH) battery and so forth. However, the kind of the battery may not be specifically limited to these examples.

The power supply units 11 to 14 may include a direct connection line for directly outputting the battery voltage, a DC/DC convertor of either step-up or step-down type, an LDO regulator, a charge pump circuit, a connection in series of the DC/DC convertor and the regulator, and so forth. The term LDO mentioned above is the abbreviation for low dropout, and the LDO regulator is a series regulator (or linear voltage regulator) for stabilizing DC input voltage and outputting subsequently.

The plural power supply units, 11 to 13, are not necessarily limited to those having specific configurations, but any type of power sources capable of supplying source power to the load may be adapted.

The loads 31 to 33 each include a device and IC, which may operate in a burst manner of either periodic or aperiodic, in that the maximum instantaneous current at the time of the burst operation is comparatively large and as much as 1000 mA or more, for example. It may be noted that these devices are brought to an off-state while not operating, with no or almost none of power consumption is involved. In addition, the devices may further include those with normally either medium or low power consumption. Although it is assumed that the working voltage differs for respective loads, some of them may coincide with each other in working voltage. In addition, it is preferred that these plural loads are configured not to operate simultaneously and that, at least in the case where two or more loads are in operation, the load except one of them is operated in the mode capable of being driven within the current supply capacity of the power supply unit for supplying the power to those loads (with no current supply from the large-capacitance capacitor). For example, in the case of power amplifiers as the load, although the driving current of approximately 2 A is necessary for outputting the maximum output 33 dBm for Global System for Mobile Communications (GSM), the current of approximately 800 mA is sufficient for the reduced output of 27 dBm.

The large-capacitance capacitor 24 includes those capable of storing massive amounts of electric charges such as an electric double layer capacitor, a lithium ion capacitor, a ceramic capacitor, and so forth. The capacitance of 1 mF or more is suitably used for the large-capacitance capacitor 24, for example.

The voltage monitoring unit 17 serves as a means for monitoring the voltage of the large-capacitance capacitor 24, and is configured to inform monitoring results to the control unit 15.

The switches 21 to 23 each serve as switching means for selectively connecting the voltage of the large-capacitance capacitor 24 to the loads 31 to 33, and are subjected individually to the on-off control by the control unit 15. To be more specific, although MEMS device, semiconductor switch, and so forth may be used as the switches 21 to 23, p-MOSFET is suitably utilized, for example. For the MOSFET, on-resistance of 0.2 ohm or less and the maximum current of 2 A or more are preferred.

The discharge unit 25 serves as a means for discharging the charges stored in the large-capacitance capacitor 24 to the ground, and is subjected to on-off control by the control unit 15. When the large-capacitance capacitor 24 is switched from a first load to a second load, according to control by the control unit 15, with the output voltage of the large-capacitance capacitor 24 being higher than the operating voltage of the second load, the discharge unit 25 serves to discharge electric charges of the large-capacitance capacitor 24 so that the voltage of the capacitor decreases to the operating voltage.

The control unit 15 is provided including CPU, a memory, and so forth, to serve as the unit for controlling electronic instrument to which electric power is supplied by the power supply units. The control unit 15 is configured to control the switches, 21 to 23, for connecting the large-capacitance capacitor to respective loads according to the application of the electric instrument, and to control the electric discharge unit 25 in response to the output of the voltage monitoring unit 17. By connecting the large-capacitance capacitor 24 to the load presently driven after appropriately turning the switches, 21 to 23, according to the current consumption and operating conditions of the loads to be possibly driven, the current assist capability is provided, by utilizing one single large-capacitance capacitor 24, to the electric power system which drives plural loads.

Incidentally, in case of switching over from the power supply unit A (3.3 V) to the power supply unit B (2.8 V), the voltage of 3.3 V is applied to large-capacitance capacitor. If this is further connected as it is to the power supply unit B, the adverse current flow to the side of the power supply unit and so forth may occur, thereby possibly causing a system malfunction. In this case, therefore, the electric charges of the capacitor are discharged through the discharge unit 25 to the voltage as low as 2.8 V, and the connection to the power supply unit B is established subsequently. This voltage drop down to 2.8 V is monitored by the voltage monitoring unit 17 and informed to the control unit 15 instantaneously.

Figure 2:
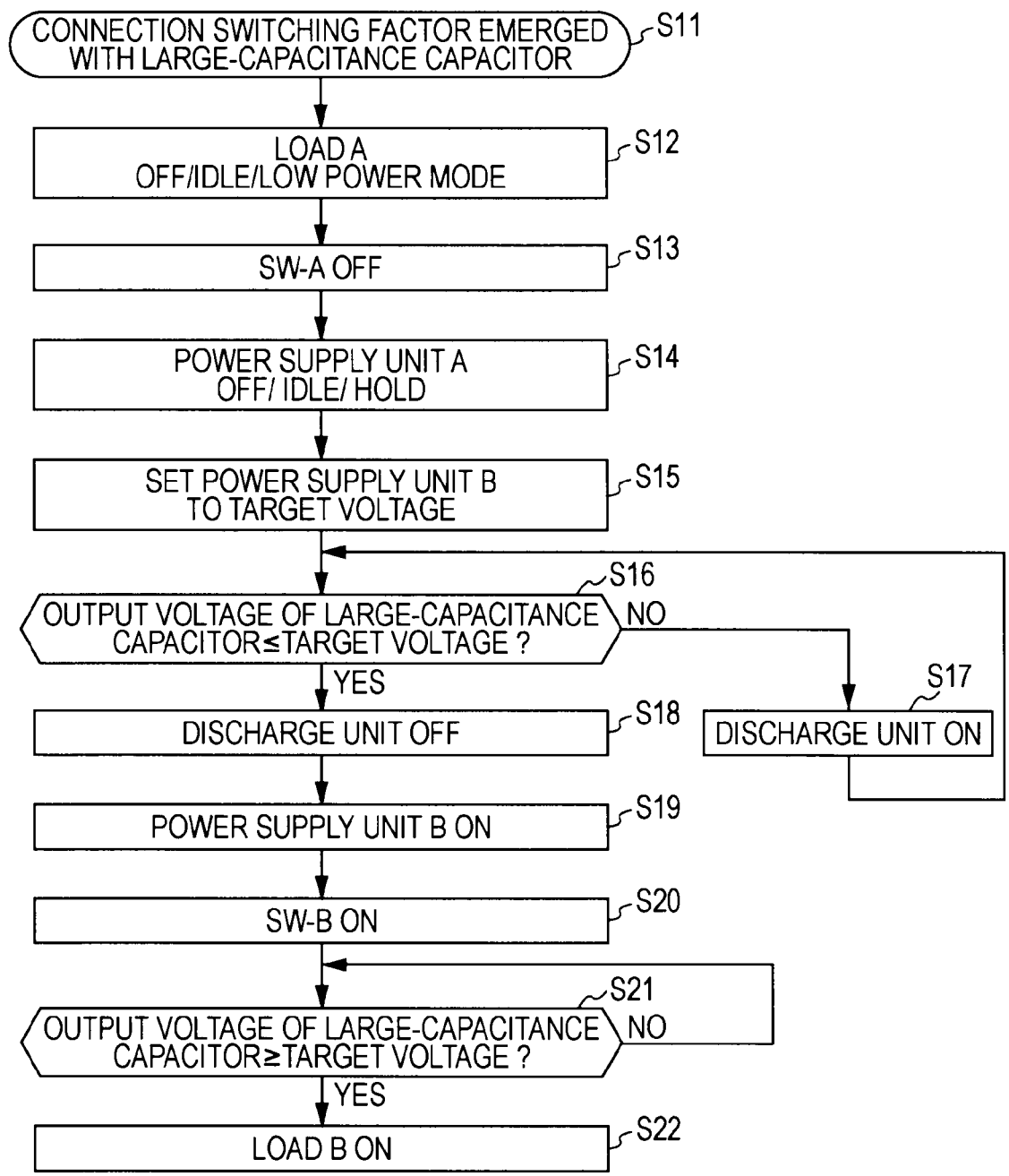
FIG. 2 is a flowchart illustrating the concrete operation with the power supply system of FIG. 1.

The specific operation with the abovementioned system configuration will be explained hereinbelow with reference to the flowchart of FIG. 2. The operation illustrates the exemplary process carried out by the control unit 15.

In the electronic instrument including the power supply system shown in FIG. 1, there assumed at this moment is that a factor related to the switching connection has emerged with the large-capacitance capacitor 24 (step S11). As the loads to be driven, herein exemplified is the case where the drive of the load A tentatively stops, while the drive of the load B starts.

First, the load A is brought to a stop (off) (step S12). Instead of the stop, the load may alternatively be brought to either an idling state or low power mode (LowPowerMode). In the case of low power mode, it is necessary for the current consumption to be equal to at most the maximum current of the power supply unit. The selection among the modes is appropriately carried out depending on the application as the load, thereby each leading to different operation. For example, in the case of the load such as a camera flash, the current consumption can be suppressed as in the off-state when a camera unit is not operating. However, in the case where the load is a power amplifier (PA) and used in the transmission with the low or intermediate power, this load is suitably allowed to maintain the connection. Then, the switch corresponding to the load A out of the switches 21 to 23 (now called as switch A) is turned off from on, and the large-capacitance capacitor 24 is disconnected from the power supply unit (S13). The power supply unit A is assumed at present in either stop (off), idling state (idling), or hold as is (hold) (S14). The operation of the power supply unit A differs depending of the mode of the load A. For example, if the load is turned off, "off/idling" may preferably be selected for suppressing the current consumption; while "hold" is appropriate, if the load continues to be on.

Subsequently, the output of the power supply unit B is set to a target voltage (S15). The target voltage differs depending specifically on which power supply unit. The target voltage corresponding to respective power supply units can be verified by referring to a look-up table 30 shown in FIG. 3, for example, which has been prepared in advance. The look-up table 30 may be stored in a memory included in the control unit 15, for example.

The voltage monitoring unit 17 is configured to monitor the output voltage of the large-capacitance capacitor 24 as compared with the target voltage (S16). If the output voltage of the large-capacitance capacitor is higher than the target voltage (No at step S16), the control unit 15 instructs in the meantime, in response to the output of the voltage monitoring unit 17, to turn the discharge unit 25 on (S17) and to discharge electric charges stored in the large-capacitance capacitor 24. When the output voltage of the large-capacitance capacitor has decreased to the target voltage (Yes at step S16), the control unit 15 instructs to turn the discharge unit 25 off in response to the change of the output of the voltage monitoring unit 17, thereby bringing the discharge to a stop (S18). If the output voltage of the large-capacitance capacitor is equal to the target voltage or lower, the discharge unit 25 remains in the off state.

After turning the discharge unit 25 off, the power supply unit B is turned on (S19). This makes the electric power supply is now ready to the load B from the large-capacitance capacitor 24, which has reached the target voltage. Subsequently, both the power supply unit B and the switch corresponding to the load B (now called as switch B) are turned on (S20). As a result, the power supply becomes feasible from the large-capacitance capacitor 24 to the load B.

Thereafter, when the output voltage of the large-capacitance capacitor 24 is confirmed by the voltage monitoring unit 17 to have reached the target voltage through the charging to the large-capacitance capacitor 24 (Yes at step 21), the control unit 15 instructs to turn the load B on (S22).

Figure 4:
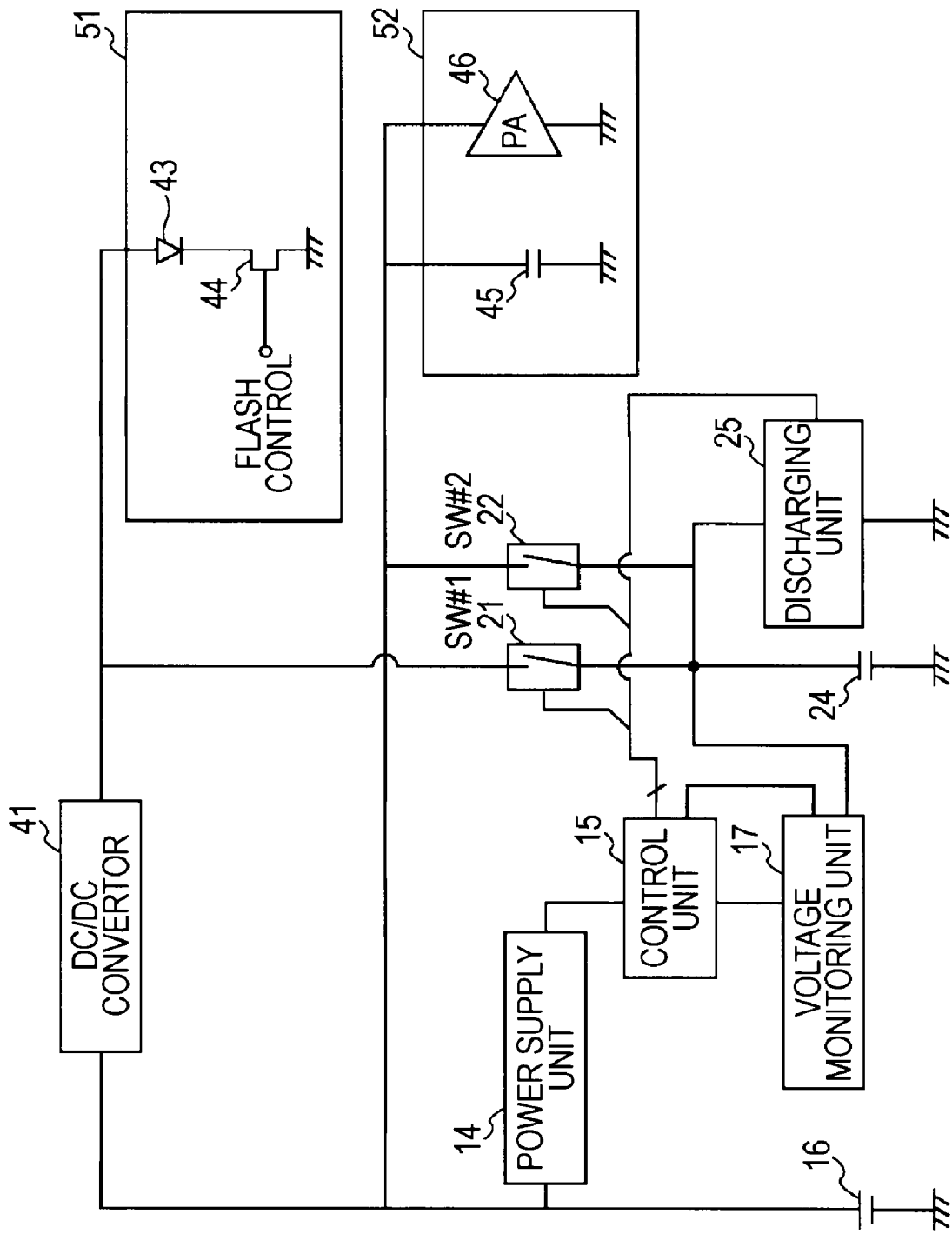
FIG. 4 is a schematic block diagram illustrating a more specific configuration according to another embodiment of the invention.

In the next place, FIG. 4 is a schematic block diagram illustrating a more specific configuration according to another embodiment of the invention. This drawing has been prepared corresponding to the configuration of electronic instrument such as a mobile-phone terminal. Since this configuration is similar to that of FIG. 1, the elements and units similar to those included in FIG. 1 are shown herein with identical numerical representations and the repeated description thereof is omitted.

In this configuration, there provided are a wireless communication unit 52 including a power amplifier (PA) 46, as a first load; and a camera unit 51 including a flash LED 43, as a second load.

The wireless communication unit 52 includes a power amplifier 46 and a bypass capacitor 45. The camera unit 51 includes a flash LED 43 for performing a flash firing as a flash means, and a LED switch 44 for properly driving the flash LED 43 according to flash control signals. The flash control signals are outputted by the control unit 15, for example. Although the LED switch 44 can be formed generally with MEMS, a semiconductor switch, and so forth, an N-type MOSFET is preferably suitable and the maximum current of at least 3.0 A is necessary for driving the element.

In the example of FIG. 4, the large-capacitance capacitor 24 is selectively connected to either the flash LED 43 of the camera unit 51 or the power amplifier 46 by switching over the switches 21 and 22. For using the camera unit 51, SW #1 is turned on and SW #2 is off. In this configuration, the power of the PA 46 is supplied directly from the battery 16, it is not necessary to limit the power to medium/low power during the use of the camera unit 51. As the battery 16, a Li polymer ion battery, Li polymer battery, and so forth may be used with the output voltage ranging from 3.6 to 4.2 V. For carrying out communication using the wireless communication unit 52, by turning SW #1 off and SW #2 on, it is possible to suppress the load of the battery 16 and to seek an extended life of the battery 16.

Since the capacitor is intrinsically suffered from self-discharge, when none of the loads operates and especially the camera is either not in use or in a waiting status, it is also possible to suppress the discharge by turning off both SW #1 and SW #2 (and all other switches as well). In addition, in the case where even one of loads is operating, the switches corresponding to all other loads are brought to off.

In addition, in the example of FIG. 4, a DC/DC convertor 41 is included as the power supply unit. Since a large current can be supplied from the capacitor to the flash LED 43 when using the large-capacitance capacitor 24, the current capacity of the DC/DC converter 41 is determined by the interval of flash firing. For example, for the operation of LED firing of 3.0 A, 30 msec, and the minimum firing interval of 1 sec, a current output of at least 100 mA becomes necessary for the DC/DC converter 41. A charge pump circuit may alternatively be used for the DC/DC converter 41.

The voltage V dcdc (output voltage of the DC/DC converter) for charging the large-capacitance capacitor 24 is determined after considering the voltage drop by parasitic resistance at the time of firing. This voltage is obtained with the current I LED flowing into the flash LED 43 during the firing, internal resistance R esr of the large-capacitance capacitor, on-resistance Ron 1 of the switch SW #1, on-resistance Ron 2 of the LED switch 44, and firing voltage V LED of the flash LED 43, by the following equation, $$V\text{dcdc} = V\text{LED} + I\text{LED} \times (R\text{ esr} + R\text{on }1 + R\text{on }2).$$

The PA 46 is for use in GSM/EGPRS (enhanced General Packet Radio Service) and its maximum current flow may reach 3 A.

The capacity of the large-capacitance capacitor 24 in the configuration of FIG. 4 is determined by firing operations, the capacitance of 300 mF or more is necessary for firing at 3.0 A and 30 msec.

Figure 5:
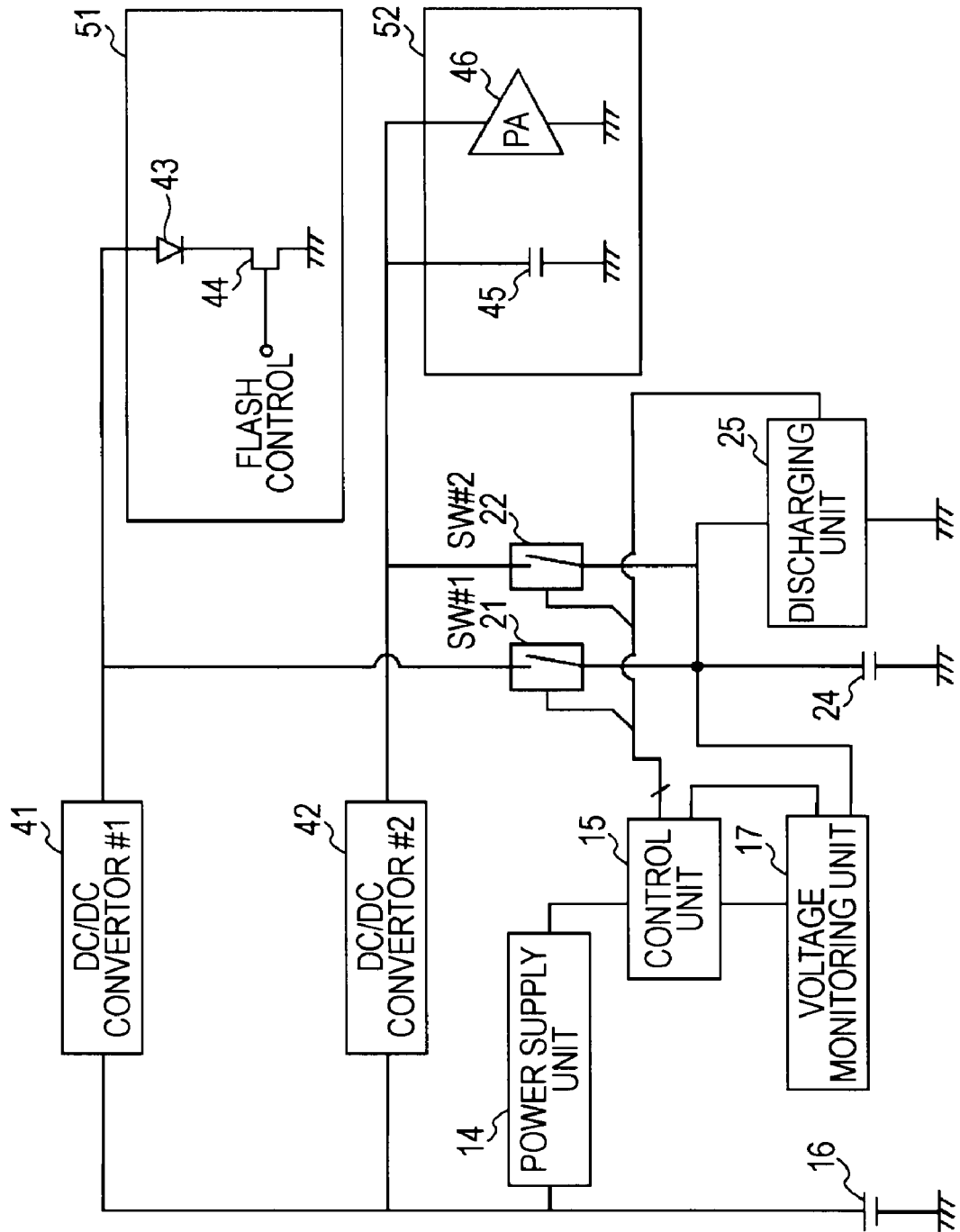
FIG. 5 is a schematic block diagram illustrating another specific configuration according to still another embodiment of the invention.

Referring to FIG. 5, there is shown another specific configuration according to another embodiment of the invention. The elements and units similar to those included in FIGS. 1 and 4 are shown herein with identical numerical representations and the repeated description thereof is omitted. The point of the present modification to the configuration of FIG. 4 is that the power is supplied to PA 46 by way of DC/DC converter 42. In this case, from constraints of size, cost, and efficiency, an up/down type DC/DC converter is suitably used with its maximum current ranging from 1 to 1.5 A. The operation becomes feasible even at lower voltages with this configuration, and the operating time can be extended when Li ion battery or Li polymer battery is used. In addition, it is also becomes possible to use batteries with lower output voltages, this results in the increase in selection flexibility of the batteries. Although the battery voltage of 3.6 V has been taken so far as final voltage, it has become feasible to use even at the voltages down to 3.0 V or less. This is equivalent to the extension of 10% or more of operating time.

When a user operates the camera unit 51, SW #1 is turned on and SW #2 is turned off. Since the current more than the maximum current (1.5 A) of DC/DC converter 42 is not supplied to PA 46 at this time, the wireless communication unit 52 is configured either to permit the communication limited within medium/low power or to disconnect the communication. It is possible to supply the current necessary for the maximum output of the PA 46 during the communication by turning SW #1 off and SW #2 on.

In addition, since the capacitor is intrinsically suffered from the self-discharge, when the camera is either not in use or in a waiting status or when the current can be suitably supplied only from the DC/DC converter 42, it is also possible to suppress the discharge by turning off both SW #1 and SW #2.

Figure 6:
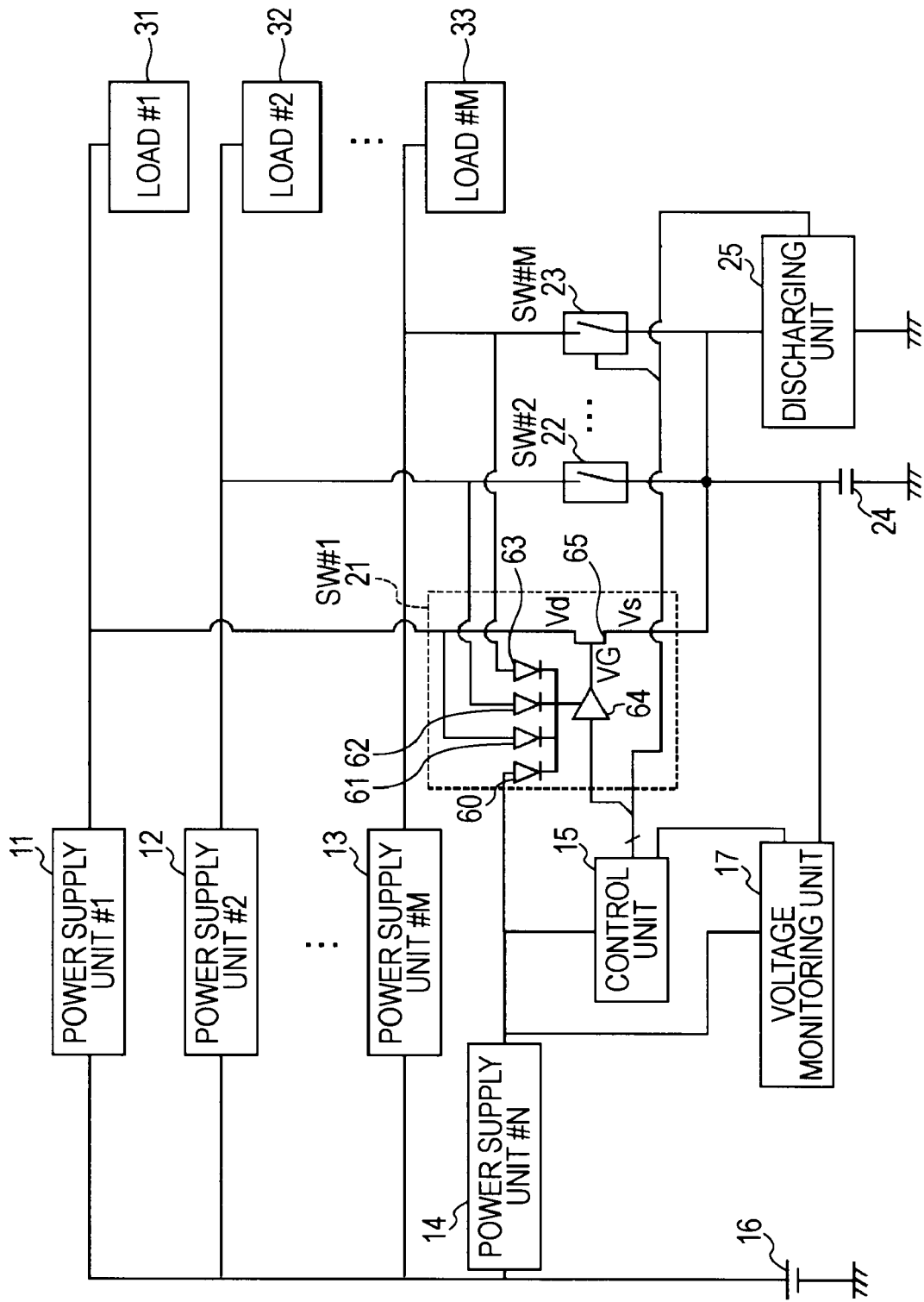
FIG. 6 is a schematic block diagram illustrating another specific example of the circuit of FIG. 1 with the emphasis on its internal structure (the switch 21 in particular)

Referring to FIG. 6, there is shown another specific example of circuit configuration of FIG. 1 with the emphasis on the internal structure of the switch 21. The elements and units similar to those included in FIG. 1 are shown herein with identical numerical representations and the repeated description thereof is omitted. The internal structure of switches, 22 and 23, is the same as that of the switch 21. The switch 21 is formed, including diodes 60 to 63, a buffer circuit 64, and a transistor (p-type MOSFET) 65. Control signals for the gate terminal of the p-type MOSFET 65 are inputted from the control part 15 through a buffer circuit 64. Regarding the diodes 60 to 63, the anodes thereof are respectively connected to the output terminal of the power supply units (#1 to #N) 11 to 14, and the cathodes thereof are connected in common to the power supply input terminal of the buffer circuit 64. The buffer circuit 64 functions as a voltage conversion means. In this example, the buffer circuit 64 operates to output the voltage of approximately the same level as the highest voltage received by the power supply input terminal, to the output terminal of the buffer circuit 64. In addition, in order to suppress the voltage drop by the diode, it is preferred for the diodes 60 to 63 to be Schottky diodes having low on-voltages, n-type FET transistors short-circuited between the gate and drain, and so forth.

In the buffer circuit 64 with this configuration, its input voltage V ctr1 is converted to the highest voltage V ctr2 among the outputs of the power supply units #1 to #N. This voltage V ctr2 is inputted as the high-level voltage for driving the p-type MOSFET 65. To be more specific, the voltage conversion is carried out by the buffer circuit 64 from V ctr1 of high level (VH)/low level (VL)=1.8V/0V to V ctr2 of VH/VL=5.5 V/0V, for example.

The reasons for achieving this capability are as follows. As the operation of the p-type MOSFET 65, when a high-level voltage is applied to the gate, it is turned off. In order to carry out this operation, the high-level voltage of the gate voltage VG is necessary to be comparable to the higher between the source and drain voltages, Vs and Vd. The off-state may not be maintained otherwise. In contrast to the voltage Vs determined by charging voltage of the large-capacitance capacitor 24, the gate voltage VG is determined to be fixed to the output voltage of the control unit 15 when applied directly from the control unit 15. In addition, the voltage Vd is determined by the output voltage of each of the power supply units. Therefore, in order to fulfill the conditions presently concerned, the driving voltage of the buffer circuit 64 is configured to be supplied from power supply units #1 to #N through diodes 60 to 63. With this configuration, the highest voltage among the power supply units #1 to #N is inputted as V ctr2 to the p-type MOSFET, and the off-state of the switch is stabilized. As a result, any malfunction caused by an unintended power supply such as, for example, from the power supply unit #1 to the load #2 can be prevented. In addition, another unintended power supply through the buffer circuit 64 can be prevented by supplying the voltage driving the buffer circuit 64 through the diodes.

Figure 7:
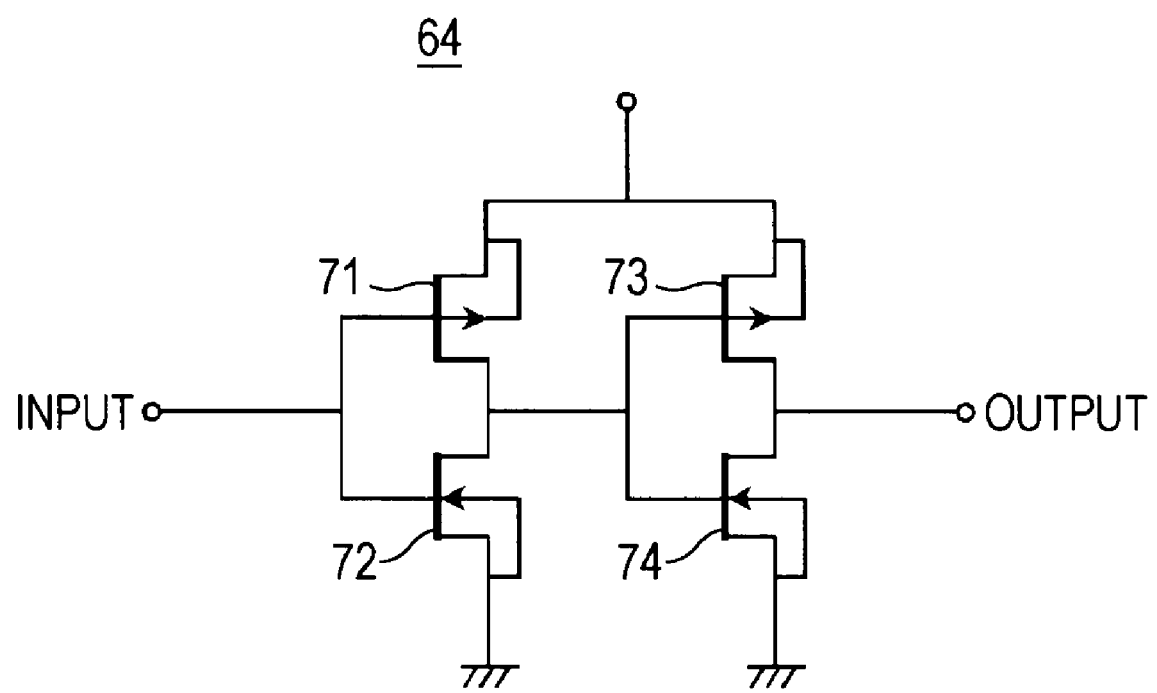
FIG. 7 is a circuit diagram illustrating the circuit configuration of the buffer circuit 64 included in FIG. 6.

FIG. 7 illustrates a circuit configuration of the buffer circuit 64. This configuration is formed, including a first CMOS circuit having n-type MOSFET 71 and p-type MOSFET 72 connected with each other in series, and a second CMOS circuit having n-type MOSFET 73 and p-type MOSFET 74 similarly connected with each other in series, in which the first and second CMOS circuits are further disposed in parallel between the power source terminal and the ground. Input signals are applied in common to the gate terminals of the first CMOS circuit, and the drain terminals of the first CMOS circuit are applied in common to the gate terminals of the second CMOS circuit. In addition, the drain terminals of the second CMOS circuit turn to be the common output terminal. With this buffer circuit 64, when an incoming signal is at low level, an output signal is also at low level. Moreover, when an incoming signal is at high level, an output signal is at high level. Incidentally, the high level changes with the power supply voltage applied to the buffer circuit 64.

Figure 8:
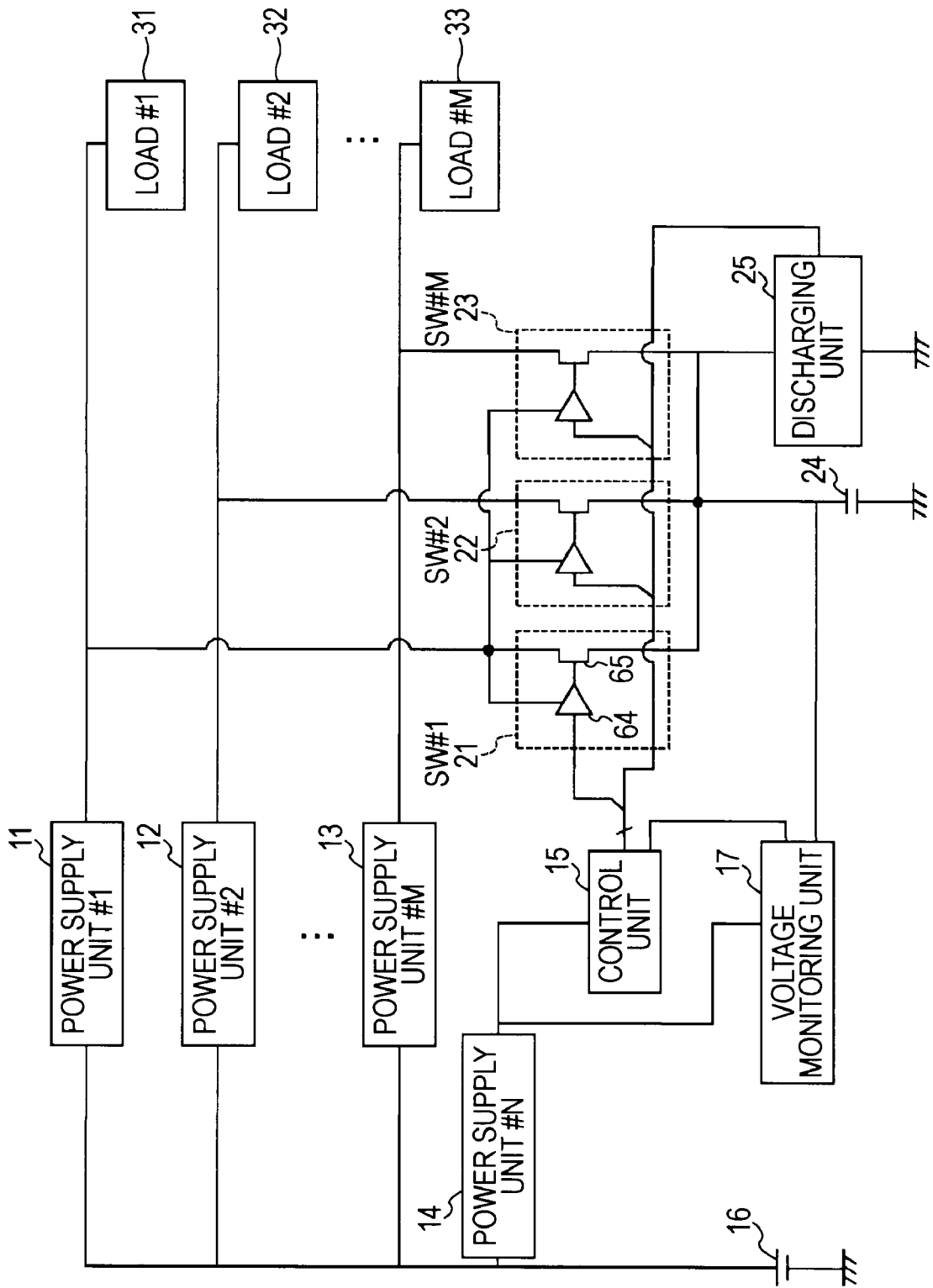
FIG. 8 shows an example of the modification to the configuration of FIG. 6.

FIG. 8 shows an example of the modification to the configuration of FIG. 6. The elements and units similar to those included in FIGS. 1 and 6 are shown herein with identical numerical representations and the repeated description thereof is omitted. The aforementioned configuration of FIG. 6 is useful when which power supply unit is not identified in advance to supply the highest voltage among the power supply units #1 to #N. On the other hand, the present configuration is useful in the case where which power supply unit is specifically identified in advance to supply the highest voltage among the power supply units and where this power supply unit stably supplies the power irrespective of the state of the switches. Namely, by supplying the driving voltage of the buffer circuit 64 connected to the input of each switch from the power supply unit supplying the highest voltage, stable switching operations can be achieved with the circuit configuration simpler than that of FIG. 6. The example of FIG. 8 illustrates the configuration in which the specific power supply unit is the power supply unit #1. The output voltage of this specific power supply unit is supplied to the power supply terminal of all the switches 21 to 23. Therefore, the diodes 60 to 63 included in each switch of FIG. 6 become unnecessary in the structure of FIG. 8.

While the present invention has been described hereinabove with reference to the preferred embodiments and specific examples, numerous modifications and alteration of the examples are feasible besides those examples mentioned earlier. For example, although the mobile-phone terminal was referred to as the example, this invention is also applicable to arbitrary electric devices which drive plural loads with the battery.

The present application contains subject matter related to that disclosed in Japanese Priority Patent Applications JP 2008-320794 and 2009-070314 filed in the Japan Patent Office on Dec. 17, 2008 and Mar. 23, 2009, respectively, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply system, comprising:
   a first plurality of power supply units configured to supply working voltages from a battery to a second plurality of loads;
   a large-capacitance capacitor configured to charge electric charges from the battery;
   a third plurality of switching means for connecting the large-capacitance capacitor to the second plurality of loads selectively;
   control means for switching the third plurality of switching means corresponding to at least one load presently in use among the second plurality of loads;
   voltage monitoring means for monitoring a voltage of the large-capacitance capacitor; and
   discharge means, in a case where an output voltage of the large-capacitance capacitor monitored by the voltage monitoring means is found higher than an operating voltage of the second load when the large-capacitance capacitor is switched from a first load to a second load, for discharging charges stored in the large-capacitance capacitor according to a control by the control means so that a voltage of the large-capacitance capacitor decreases to the operating voltage before connection to the second load.

2. The power supply system according to claim 1, wherein at least one of the second plurality of loads is one necessitating anyone of pulse currents and large currents having a constant frequency.

3. The power supply system according to claim 1, wherein the first plurality of power supply units include anyone of a direct connection line, a DC/DC convertor, an LDO regulator, and a charge pump circuit.

4. The power supply system according to claim 1, 2 or 3, wherein
   the large-capacitance capacitor includes anyone of an electric double layer capacitor, a lithium ion capacitor, and a ceramic capacitor.

5. The power supply system according to claim 1, 2 or 3, wherein
   each of the third plurality of switching means includes an FET configured to connect the first plurality of power supply units selectively with the large-capacitance capacitor, and a voltage conversion means for converting a control voltage from the control means to an output voltage corresponding to a highest voltage among outputs of the first plurality of power supply units, so that an output of the voltage conversion means is subsequently applied to the FET as a control signal.

6. The power supply system according to claim 5, wherein each of the third plurality of switching means includes a buffer circuit as the voltage conversion means and the first plurality of diodes, so that anodes of the diodes are respectively connected to output terminals of the first plurality of power supply units, and that cathodes of the diodes are connected in common to a power supply input terminal of the buffer circuit.

7. The power supply system according to claim 5, wherein each of the third plurality of switching means includes a buffer circuit as the voltage conversion means
so that an output voltage from a power supply unit is connected in common to a power supply input terminal of the buffer circuit, the power supply unit being specifically identified in advance to supply a highest voltage among the first plurality of power supply units.

8. The power supply system according to claim 1, 2, 3, 6 or 7, wherein
   all the third plurality of switching means are turned off when none of the second plurality of loads operates.

9. An electronic instrument, comprising:
   a second plurality of loads configured to be supplied with power from a battery;
   a first plurality of power supply units configured to supply working voltages from a battery to the second plurality of loads;
   a large-capacitance capacitor configured to charge electric charges from the battery;
   a third plurality of switching means for connecting the large-capacitance capacitor to the second plurality of loads selectively;
   control means for switching the third plurality of switching means corresponding to at least one load presently in use among the second plurality of loads;
   voltage monitoring means for monitoring a voltage of the large-capacitance capacitor; and
   discharge means, in a case where an output voltage of the large-capacitance capacitor monitored by the voltage monitoring means is found higher than an operating voltage of the second load when the large-capacitance capacitor is switched from a first load to a second load, for discharging charges stored in the large-capacitance capacitor according to a control by the control means so that a voltage of the large-capacitance capacitor decreases to the operating voltage before connection to the second load.

10. The electronic instrument according to claim 9, wherein
    at least one of the second plurality of loads is one necessitating anyone of pulse currents and large currents having a constant frequency.

11. The electronic instrument according to claim 9, wherein
    the first plurality of power supply units include anyone of a direct connection line, a DC/DC convertor, an LDO regulator, and a charge pump circuit.

12. The electronic instrument according to claim 9, 10 or 11, wherein
    the large-capacitance capacitor includes anyone of an electric double layer capacitor, a lithium ion capacitor, and a ceramic capacitor.

13. The electronic instrument according to claim 9, wherein
    the electronic instrument is a mobile-phone terminal including a wireless communication unit and a camera unit, and the first load is a power amplifier included in the wireless communication unit and the second load is a flash generation means.

14. The electronic instrument according to claim 9, 10, 11 or 13, wherein
    all the third plurality of switching means are turned off when none of the second plurality of loads operates.

15. A power supply system, comprising:
    a first plurality of power supply units configured to supply working voltages from a battery to a second plurality of loads;
    a large-capacitance capacitor configured to charge electric charges from the battery;
    a third plurality of switching mechanisms configured to connect the large-capacitance capacitor to the second plurality of loads selectively; and a control mechanism configured to switch the third plurality of switching mechanisms corresponding to at least one load in use presently among the second plurality of loads a voltage monitor to monitor a voltage of the large-capacitance capacitor; and a discharge mechanism, in a case where an output voltage of the large-capacitance capacitor monitored by the voltage monitor is found higher than an operating voltage of the second load when the large-capacitance capacitor is switched from a first load to a second load, for discharging charges stored in the large-capacitance capacitor according to a control by the control mechanism so that a voltage of the large-capacitance capacitor decreases to the operating voltage before connection to the second load.

16. An electronic instrument, comprising:

a second plurality of loads configured to be supplied with power from a battery;

a first plurality of power supply units configured to supply working voltages from a battery to the second plurality of loads;

a large-capacitance capacitor configured to charge electric charges from the battery;

a third plurality of switching mechanisms configured to connect the large-capacitance capacitor to the second plurality of loads selectively; and a control mechanism configured to switch the third plurality of switching mechanisms corresponding to at least one load presently in use among the second plurality of loads a voltage monitor to monitor a voltage of the large-capacitance capacitor; and a discharge mechanism, in a case where an output voltage of the large-capacitance capacitor monitored by the voltage monitor is found higher than an operating voltage of the second load when the large-capacitance capacitor is switched from a first load to a second load, for discharging charges stored in the large-capacitance capacitor according to a control by the control mechanism so that a voltage of the large-capacitance capacitor decreases to the operating voltage before connection to the second load.

* * * * *